(12) United States Patent
Watt

(10) Patent No.: US 7,472,895 B2
(45) Date of Patent: Jan. 6, 2009

(54) WOOD AIR DIFFUSER FOR USE IN SALTWATER AQUARIUM FOAM FRACTIONATORS

(76) Inventor: Ronald D. Watt, 289 Silverbirch Boulevard, Mount Hope, Ontario (CA) I0r 1w0

(*) Notice: Subject to any disclaimer, the term of this patent is extended or adjusted under 35 U.S.C. 154(b) by 414 days.

(21) Appl. No.: 11/401,911

(22) Filed: Apr. 12, 2006

(65) Prior Publication Data

US 2006/0273477 A1    Dec. 7, 2006

Related U.S. Application Data

(60) Provisional application No. 60/674,339, filed on Apr. 25, 2005.

(51) Int. Cl.
*B01F 3/04* (2006.01)
(52) U.S. Cl. .................. 261/122.1; 119/263
(58) Field of Classification Search ............. 261/121.1, 261/122.1, 124; 119/263
See application file for complete search history.

(56) References Cited

U.S. PATENT DOCUMENTS

| | | | | |
|---|---|---|---|---|
| 1,208,821 | A | * | 12/1916 | Nordell .................... 261/121.1 |
| 1,281,816 | A | * | 10/1918 | Nordell .................... 261/122.1 |
| 2,216,791 | A | * | 10/1940 | Simjian ....................... 261/42 |
| 2,294,973 | A | * | 9/1942 | Ford ......................... 261/122.1 |
| 3,711,072 | A | * | 1/1973 | Waldenville ............. 261/122.1 |
| 4,192,255 | A | * | 3/1980 | Willinger ..................... 119/263 |
| 4,655,915 | A | * | 4/1987 | Carpinone ............. 210/167.26 |
| 4,902,418 | A | * | 2/1990 | Ziegler .................. 210/321.77 |
| 5,030,362 | A | * | 7/1991 | Da Silva et al. ............. 210/774 |
| 5,034,165 | A | * | 7/1991 | Willinger et al. ......... 261/122.1 |
| 5,133,906 | A | * | 7/1992 | Louis ....................... 261/122.1 |
| 5,256,282 | A | * | 10/1993 | Chang et al. ........... 210/167.26 |

* cited by examiner

*Primary Examiner*—Scott Bushey

(57) ABSTRACT

An air diffuser has a wood block with two end-grain faces at opposite ends and an elongated air chamber extending substantially parallel to and equidistant from the end-grain faces. Air under pressure is supplied to the air chamber. The air chamber is otherwise closed to cause air under pressure in the air chamber to travel through the wood block to the end-grain faces and diffuse into surrounding water when the diffuser is immersed therein.

6 Claims, 2 Drawing Sheets

WOOD AIR DIFFUSER FOR USE IN SALTWATER AQUARIUM FOAM FRACTIONATORS

RELATED APPLICATIONS

This invention claims priority from U.S. Provisional patent application No. 60/674,339 issued Apr. 25, 2005.

FIELD OF INVENTION

This invention relates to wood air diffusers for use in saltwater aquarium foam fractionators.

BACKGROUND OF INVENTION

Air diffusers comprising blocks of wood have been used for many years in the operation of co-current and counter-current foam fractionators. The wood blocks are typically of basswood (limewood) or oak with a drilled hole extending from an end face of the block perpendicularly to the normal grain of the wood. The drilled hole does not pierce the opposite end face of the block. An air fitting allowing connection to a positive pressure air supply is inserted in the open end of the drilled hole. Air under pressure injected into the block through the air fitting follows the normal grain of the wood and exists the block from both end faces in the form of small bubbles. In saltwater, these bubbles are usually very small, e.g. less than about 1 mm in diameter.

A major problem with conventional wood air diffusers is their inability to produce copious amounts of small diameter bubbles for an extended period of time, thereby necessitating frequent replacement. The primary cause of this problem is the lack of uniform distribution of air flowing through the wood block. With the end faces of the block being straight and the drilled hole being circular in cross section, the shortest path for air to flow from the drilled hole to the closest location on an end face of the block is the path of least resistance to air flow. Continued airflow concentrated along this short pathway and the presence of saltwater causes the block to deteriorate over time, resulting in the production of fewer bubbles and increased bubble size. This results in reduced levels of protein removal in foam fractionators because protein, which is attracted to an air-water interface, has a greatly reduced surface to cling to with larger bubbles compared to more smaller bubbles for a given volume of air.

It is therefore an object of the invention to provide a wood air diffuser which has a longer operating life and continues to produce an adequate number of small bubbles during its operating life.

SUMMARY OF THE INVENTION

According to the invention, an air diffuser comprises a wood block having two end-grain faces at opposite ends and an elongated air chamber extending substantially parallel to and equidistant from the end-grain faces, and means for supplying air under pressure to the air chamber, the air chamber being otherwise closed to cause air under pressure in the air chamber to travel through the wood block to the end-grain faces and diffuse into surrounding water when the diffuser is immersed therein.

It has been found that such an air diffuser substantially overcomes the above-mentioned disadvantage of known wood air diffusers.

The diffuser may be provided with a saltwater resistant weight in the air chamber to cause the weighted block to be self sinking when immersed in saltwater.

DESCRIPTION OF THE DRAWINGS

Embodiments of the invention will now be described, by way of example, with reference to the accompanying drawings, of which.

DESCRIPTION OF PREFERRED EMBODIMENTS

Figure 1:
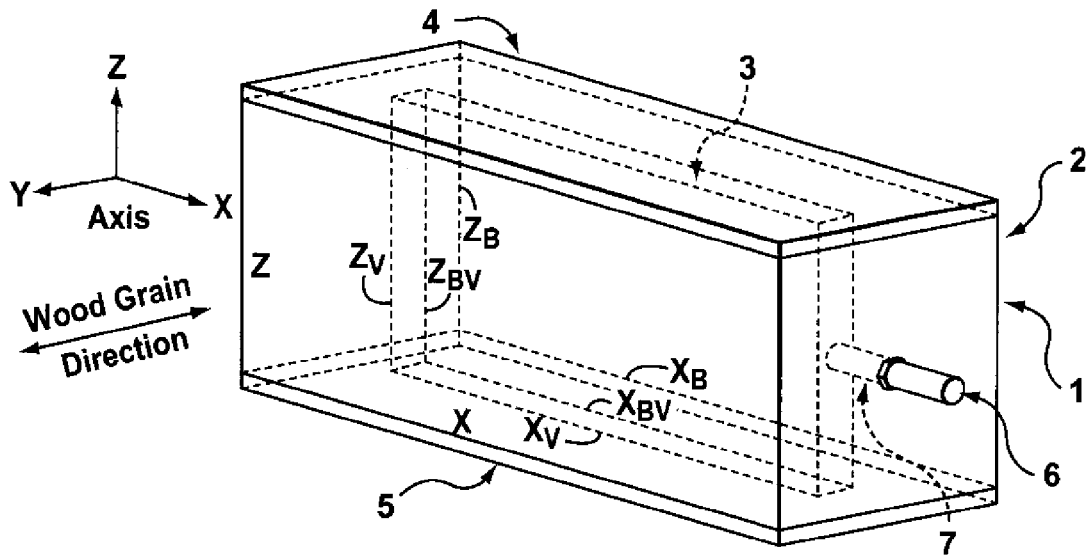
FIG. 1 is a perspective view of a wood air diffuser in accordance with one embodiments and having top and bottom covers.
Figure 2:
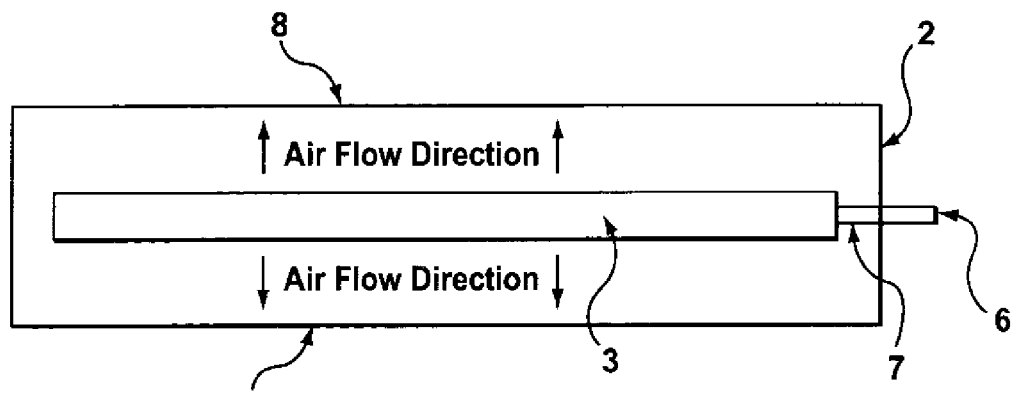
FIG. 2 is a top view thereof with the top cover removed.

Referring first to FIGS. 1 to 3A of the drawings, an air diffuser 1 comprises a wood block 2 having a rectangular air chamber 3 located equidistant from and parallel to two opposite end faces 8 of the block. The air chamber 3 is equidistant in its Y axis component (see FIG. 1) between the end grain plane surface XZ and at least 25% of the XvZv plane surface of the air chamber 3, and between the end grain plane surface XbZb and at least 25% of the XbvZbv plane surface of the air chamber 3.

The air chamber 3 completely traverses the wood block 2 from the top surface to the bottom surface thereof. An air passage 7 connects the air chamber 3 to an air fitting 6 attachable to external tubing from a positive pressure air pump. The air chamber 3 has a top cover 4 and bottom cover 5 of non-porous material secured to the wood block 2 with water-resistant adhesive.

Figure 3A:
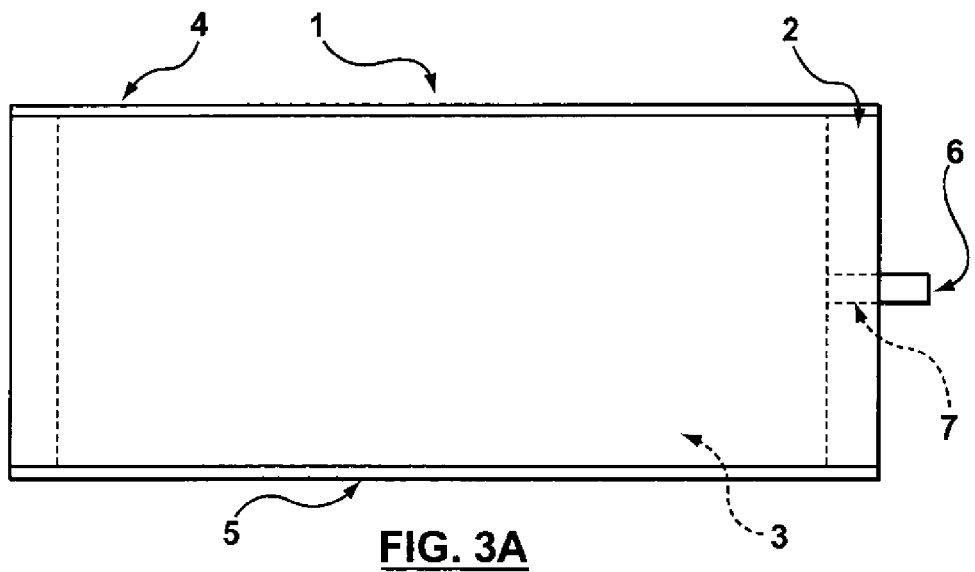
FIG. 3A is a side view thereof.
Figure 3B:
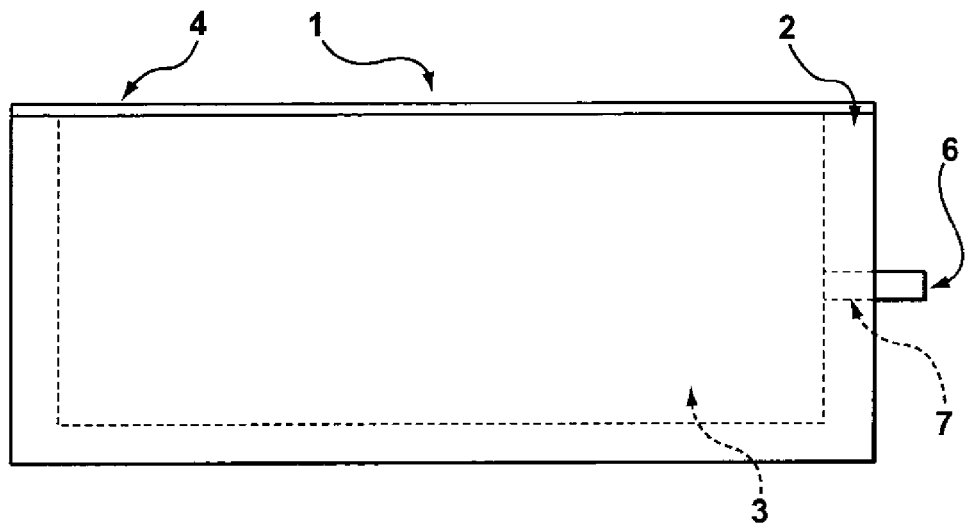
FIG. 3B is a similar view but showing another embodiment with a top cover.

FIG. 3B is similar to FIG. 3A but shows an air diffuser with a closed bottom and a top cover 4.

Figure 3C:
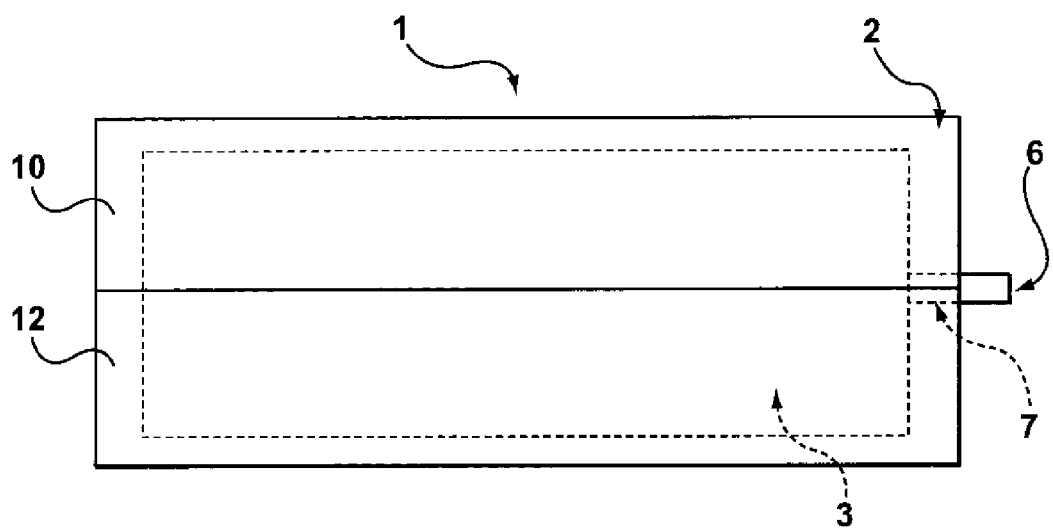
FIG. 3C is a similar view but showing a further embodiment.

FIG. 3C is a side view of an air diffuser having a wood block with an upper part 10 and a lower part 12 secured together, for example by glue.

Figure 4:
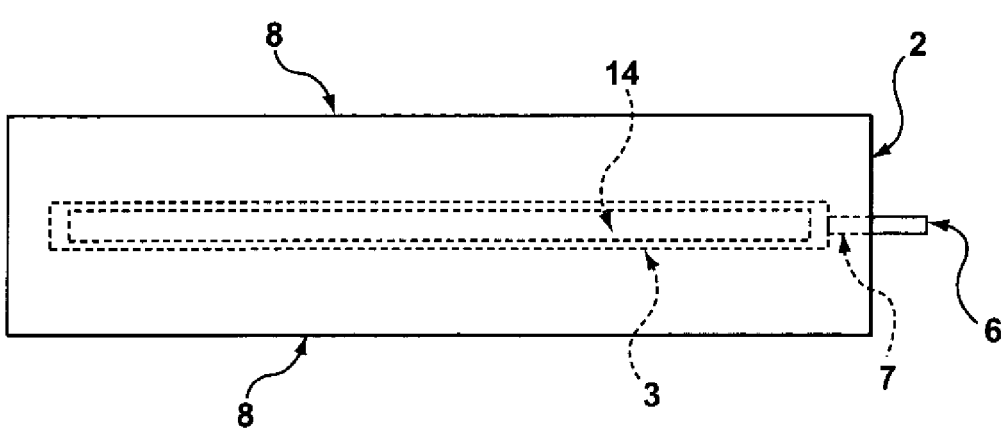
FIG. 4 is a top view of a wood air diffuser in accordance with a still further embodiment which is provided with a weight in the air chamber.

FIG. 4 shows a saltwater resistant weight 14 provided in the air chamber 3 to cause the air diffuser to be self-sinking in saltwater.

The advantages and other embodiments of the invention will now be readily apparent to a person skilled in the art from the foregoing description, the scope of the invention being defined in the appended claims.

The invention claimed is:

1. An air diffuser comprising a wood block having two end-grain faces at opposite ends and an elongated air chamber extending substantially parallel to and equidistant from the end-grain faces, and means for supplying air under pressure to the air chamber, the air chamber being otherwise closed to cause air under pressure in the air chamber to travel through the wood block to the end-grain faces and diffuse into surrounding water when the diffuser is immersed therein.

2. An air diffuser according to claim 1 wherein the air chamber has a top cover of non-porous material secured to the wood block.

3. An air diffuser according to claim 1 wherein the air chamber has a bottom cover of non-porous material secured to the wood block.

4. An air diffuser according to claim 1 wherein the air chamber has top and bottom covers of non-porous material secured to the wood block.

5. An air diffuser according to claim 1 wherein the wood block has an upper part and a lower part secured together.

6. An air diffuser according to claim 1 wherein the air chamber contains a water-resistant weight to cause the air diffuser to be self-sinking.

* * * * *